(12) United States Patent
Kruger et al.

(10) Patent No.: US 12,146,555 B1
(45) Date of Patent: Nov. 19, 2024

(54) SYSTEMS FOR DIFFERENTIAL ASSEMBLY

(71) Applicant: Dana Automotive Systems Group, LLC, Maumee, OH (US)

(72) Inventors: Caleb Kruger, Delta, OH (US); Brandon Pound, Toledo, OH (US)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 0 days.

(21) Appl. No.: 18/354,455

(22) Filed: Jul. 18, 2023

(51) Int. Cl.
*F16H 48/08* (2006.01)

(52) U.S. Cl.
CPC ....... *F16H 48/08* (2013.01); *F16H 2048/085* (2013.01)

(58) Field of Classification Search
CPC ............................ F16H 48/08; F16H 2048/085
See application file for complete search history.

(56) References Cited

U.S. PATENT DOCUMENTS

| | | | |
|---|---|---|---|
| 3,974,717 A | 8/1976 | Breed et al. | |
| 5,647,814 A | 7/1997 | Krisher | |
| 7,591,751 B2 | 9/2009 | Sudorowski et al. | |
| 7,695,392 B2 | 4/2010 | Isken, II et al. | |
| 9,958,047 B1 * | 5/2018 | Balenda, II | ............. F16H 48/08 |
| 2019/0257399 A1 * | 8/2019 | Lang | ....................... F16H 48/08 |

FOREIGN PATENT DOCUMENTS

| | | | | |
|---|---|---|---|---|
| DE | 19943920 A1 * | 3/2001 | ............. | F16H 48/08 |
| JP | 10159940 A * | 6/1998 | ............. | F16H 48/08 |
| JP | 2000291776 A * | 10/2000 | ............. | F16H 48/08 |

OTHER PUBLICATIONS

JP2000291776A machine translation filed Nov. 15, 2023, pp. 1-10. (Year: 2023).*

* cited by examiner

*Primary Examiner* — Tisha D Lewis
(74) *Attorney, Agent, or Firm* — McCoy Russell LLP

(57) ABSTRACT

Systems are provided for a differential of a powertrain. In one example, a system includes a primary differential pin comprising an I-beam middle section and a secondary differential pin including a slot that interlocks with the I-beam middle section. A pair of the secondary differential pins interlocks with the primary differential pin in a differential assembly.

15 Claims, 6 Drawing Sheets

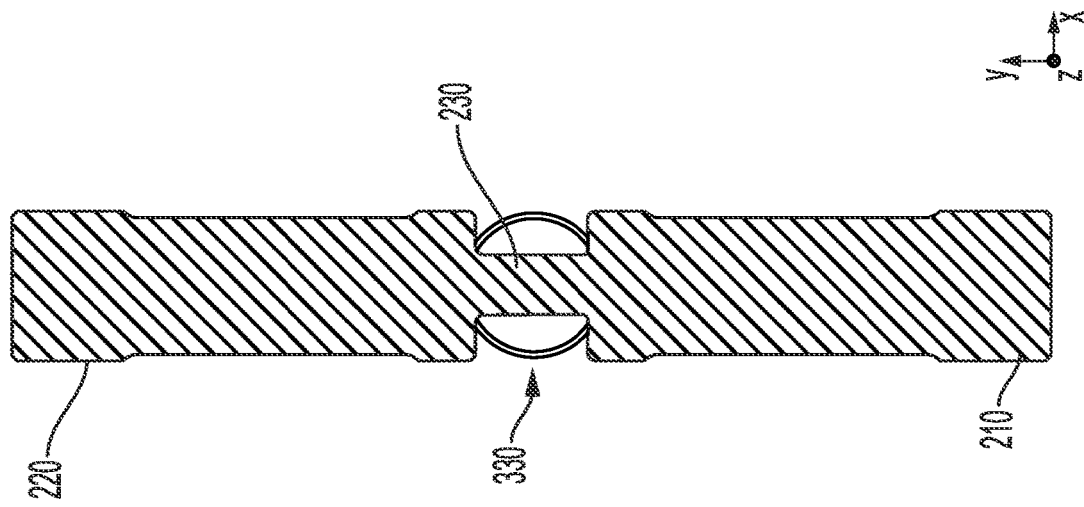
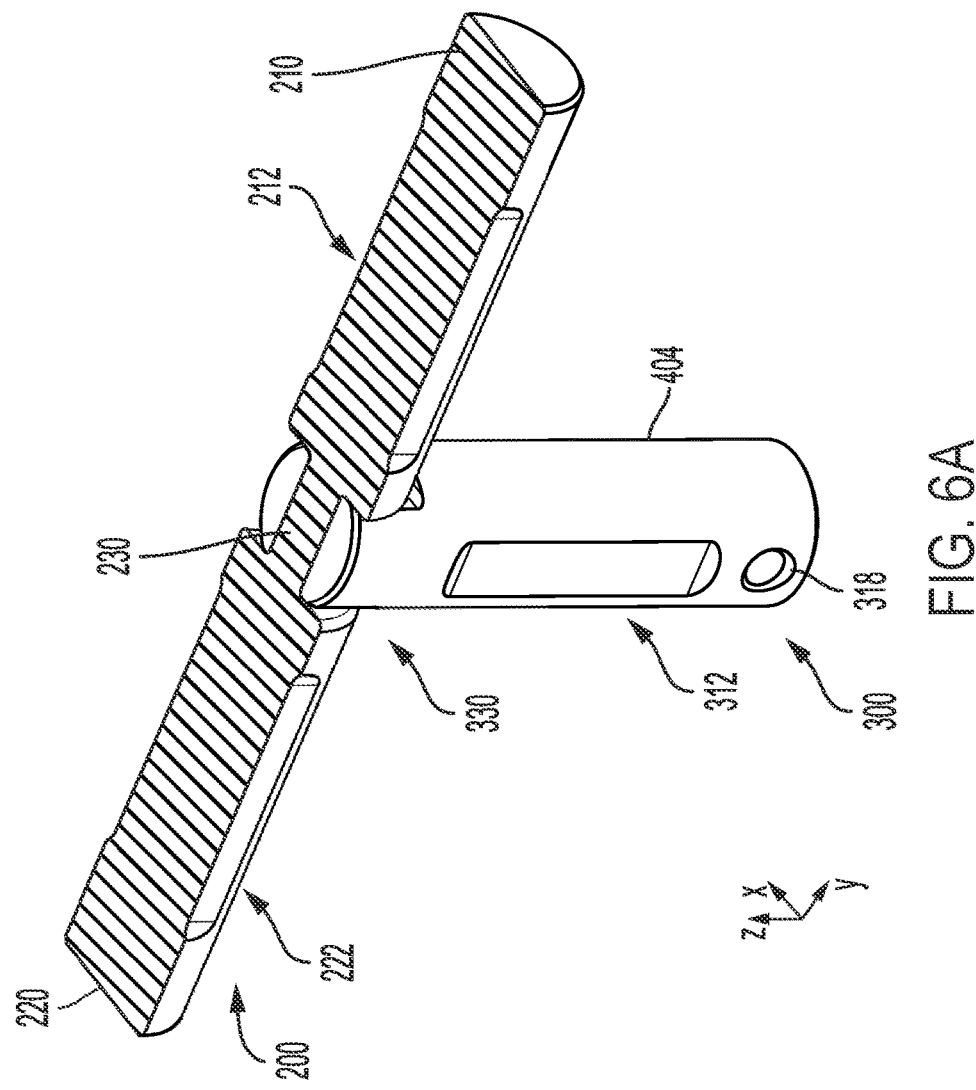
FIG. 6A
FIG. 6B

SYSTEMS FOR DIFFERENTIAL ASSEMBLY

TECHNICAL FIELD

The present description relates generally to a pin for a differential assembly.

BACKGROUND AND SUMMARY

Vehicles continue to demand reduced powertrain packaging sizes. The changes in beam axle designs may force gear and bearing positions into undesired positions. These positions may increase a manufacturing difficulty and/or a difficulty in providing maintenance to the gears and bearings.

For example, coupling of the differential pinions may become more challenging as packaging designs are modified to reduce a packaging size. As such, there may be a demand for systems different than those presently available to at least partially solve these issues.

In one example, a system includes a primary differential pin comprising an I-beam middle section and a secondary differential pin comprising a slot that interlocks with the I-beam middle section.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

The above, as well as other advantages of the present disclosure, will become readily apparent to those skilled in the art from the following detailed description when considered in light of the accompanying drawings in which:

FIGS. 6A and 6B are cross-sectional views of the pin assembly taken along an axis of the primary pin, according to an embodiment of the present disclosure.

DETAILED DESCRIPTION

Figure 1:
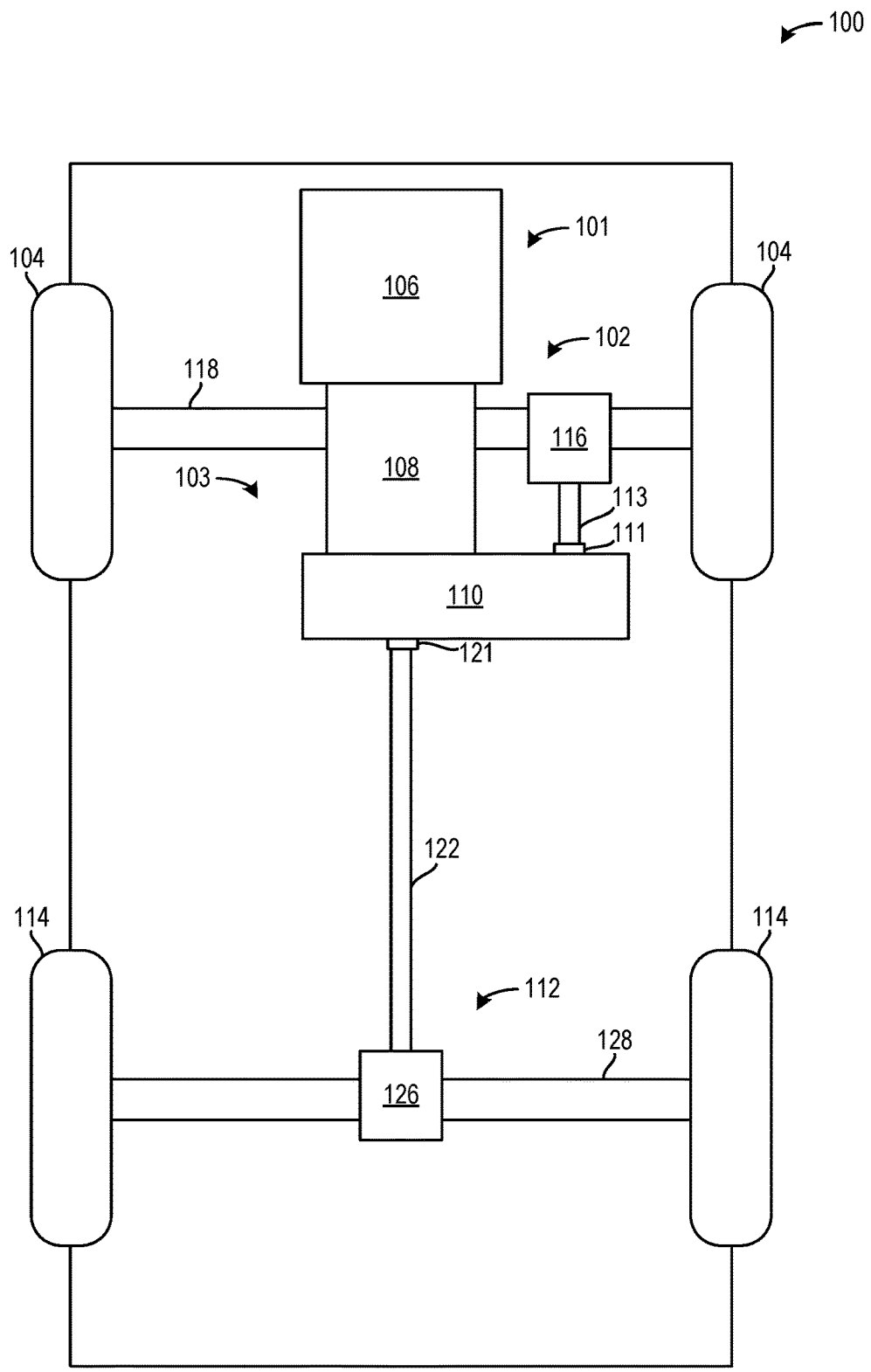
FIG. 1 is a schematic depiction of an example vehicle powertrain.
Figure 2C:
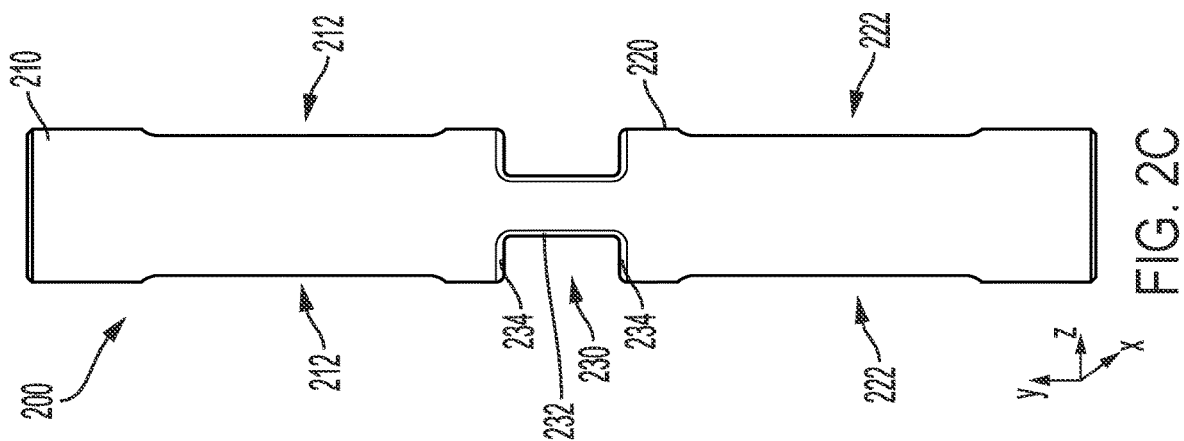
FIGS. 2A, 2B, and 2C are different views of a primary pin of a differential assembly, according to an embodiment of the present disclosure.
Figure 2B:
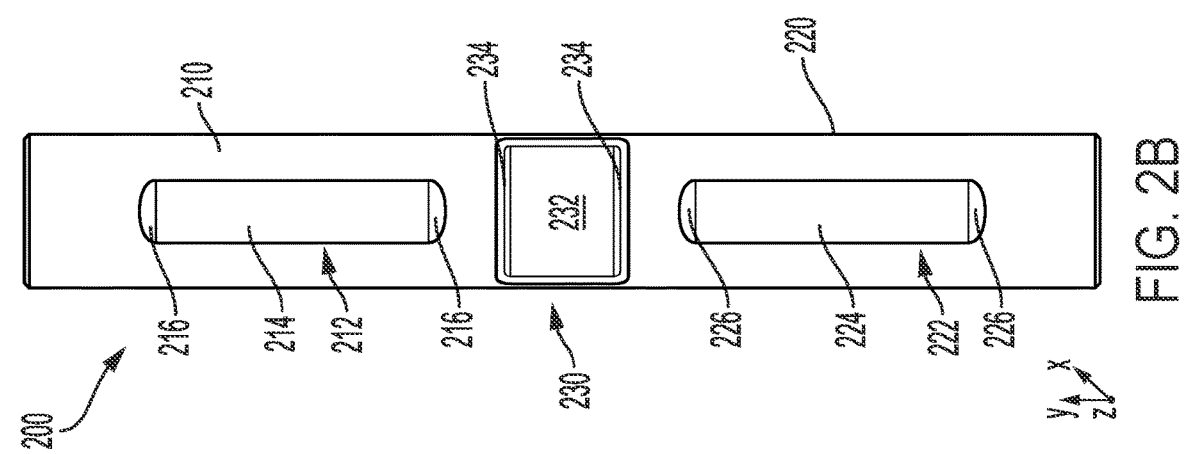
Figure 2A:
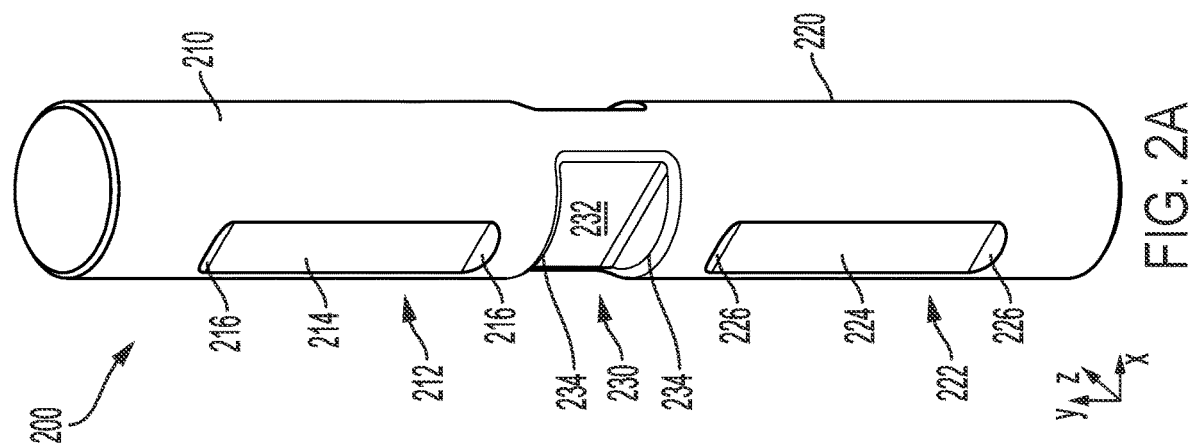
Figure 3C:
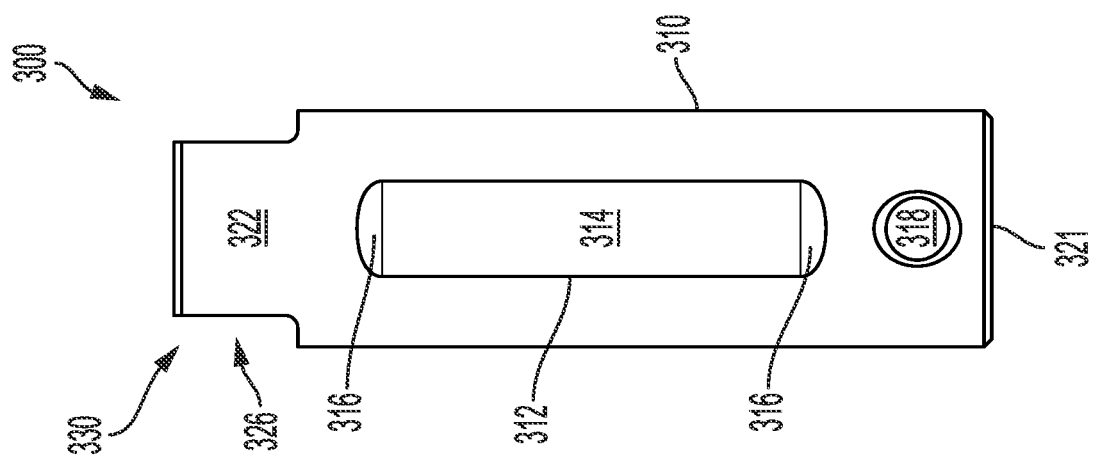
FIGS. 3A, 3B, and 3C are different views of a secondary pin of the differential assembly, according to an embodiment of the present disclosure.
Figure 3B:
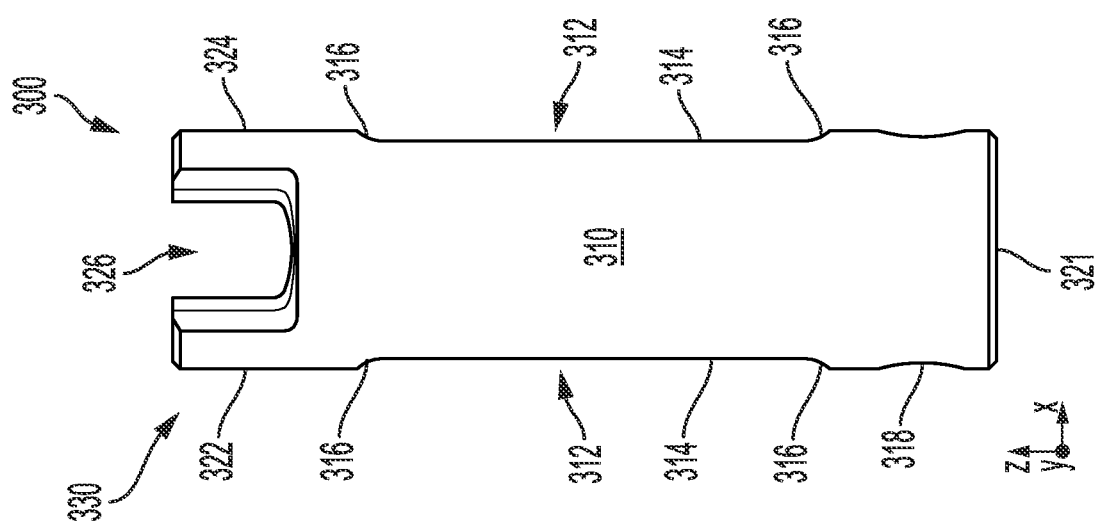
Figure 3A:
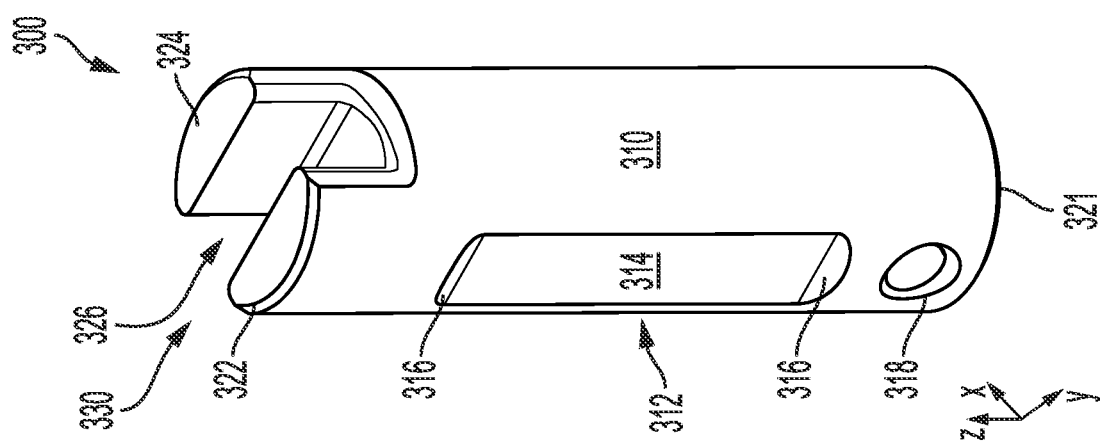
Figure 4:
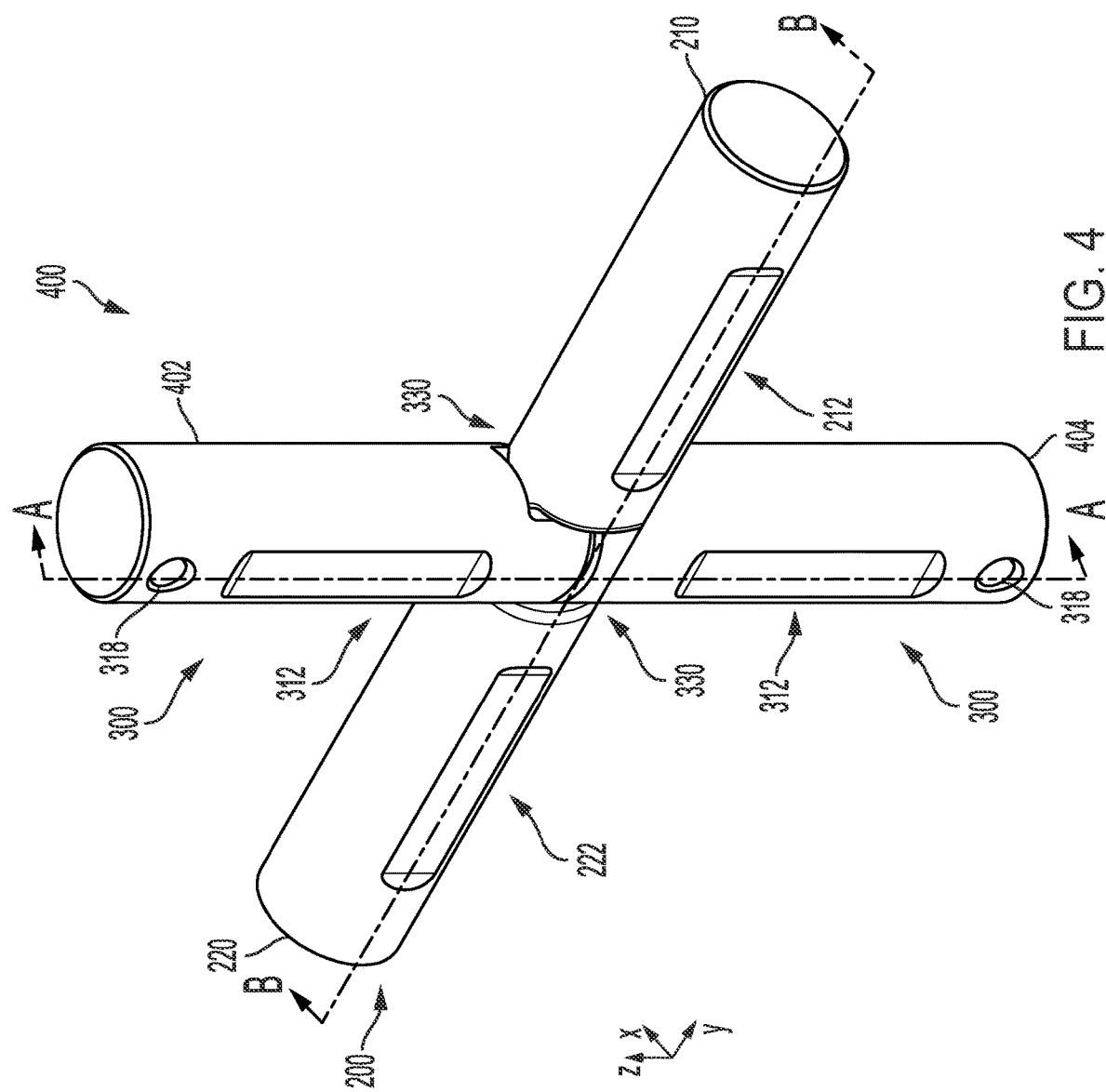
FIG. 4 is an embodiment of a pin assembly including the primary pin interfacing with the secondary pin, according to an embodiment of the present disclosure.
Figure 5B:
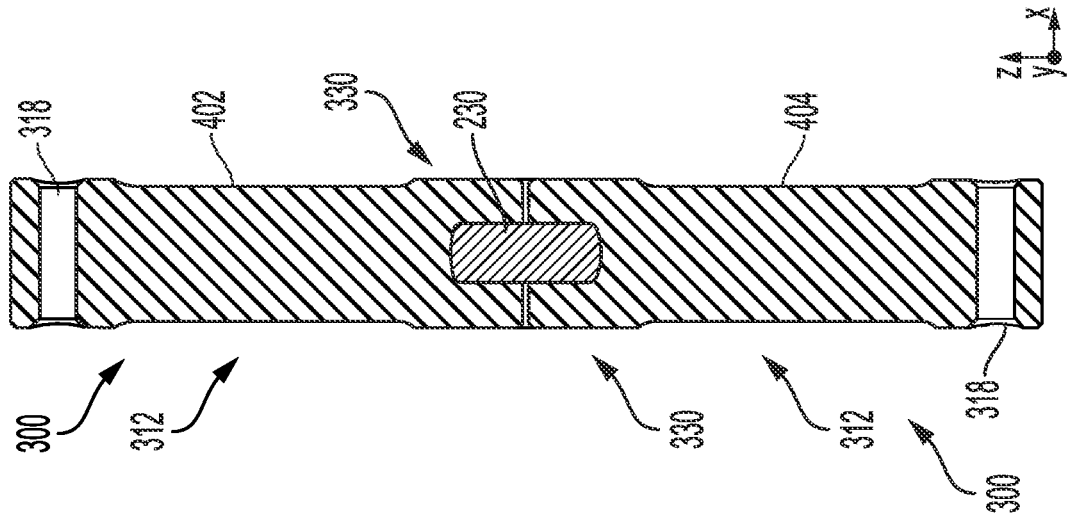
FIGS. 5A and 5B are cross-sectional views of the pin assembly taken along an axis of the secondary pin, according to an embodiment of the present disclosure.
Figure 5A:
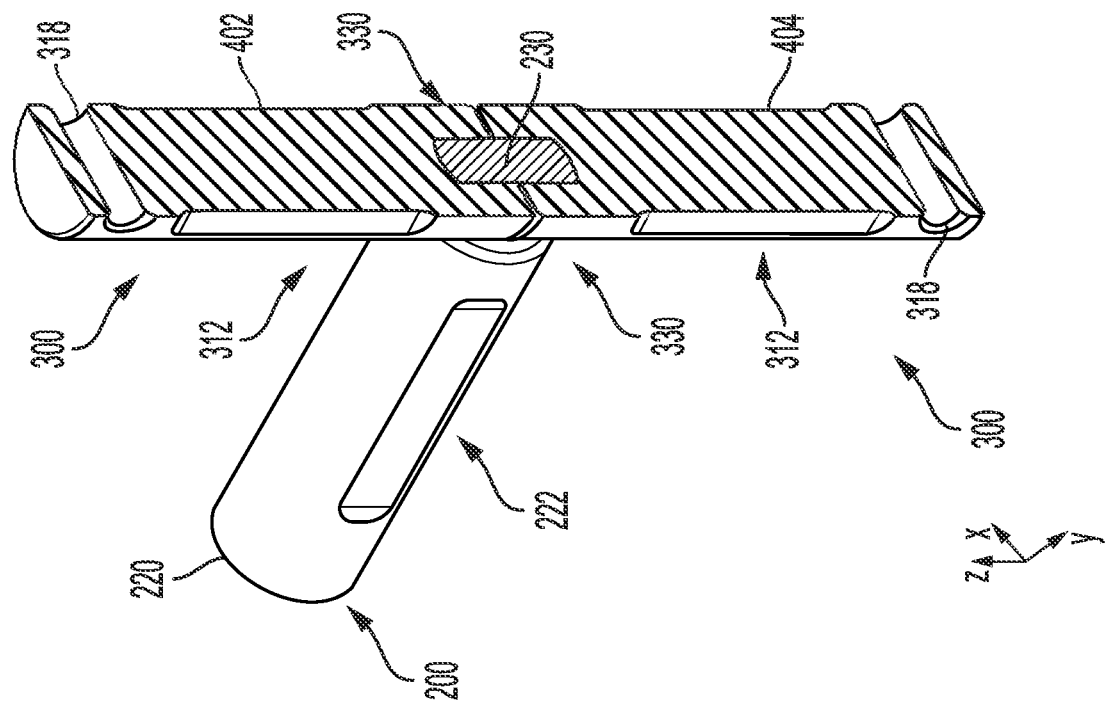

The following description relates to a system for a pin assembly of a differential of a vehicle. For example, the vehicle may be propelled by a powertrain, such as illustrated in FIG. 1. FIGS. 2A, 2B, and 2C are different views of a primary pin of a differential assembly. FIGS. 3A, 3B, and 3C are different views of a secondary pin of the differential assembly. FIG. 4 is an embodiment of a pin assembly including the primary pin interfacing with the secondary pin. FIGS. 5A and 5B are cross-sectional views of the pin assembly taken along an axis of the secondary pin. FIGS. 6A and 6B are cross-sectional views of the pin assembly taken along an axis of the primary pin.

FIGS. 1-6B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation). FIGS. 2A-6B are shown approximately to scale. However, other dimensions may be used, if desired.

Turning now to FIG. 1, a vehicle 100 is shown comprising a powertrain 101 and a drivetrain 103. The powertrain comprises a prime mover 106 and a transmission 108. The prime mover 106 may be an internal combustion engine or an electric motor, for example, and is operated to provide rotary power to the transmission 108. The transmission 108 may be any type of transmission, such as a manual transmission, an automatic transmission, or a continuously variable transmission. The transmission 108 receives the rotary power produced by the prime mover 106 as an input and outputs rotary power to the drivetrain 103 in accordance with a selected gear or setting.

The vehicle 100 may be a commercial vehicle, light, medium, or heavy duty vehicle, a passenger vehicle, an off-highway vehicle, and sport utility vehicle. Additionally or alternatively, the vehicle 100 and/or one or more of its components may be in industrial, locomotive, military, agricultural, and aerospace applications.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a front-wheel drive, a rear-wheel drive, or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some four-wheel drive configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. An embodiment of an axle assembly will be described in more detail below with respect to FIGS. 2-3C.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

Turning now to FIGS. 2A, 2B, and 2C, they show different views of a primary pin 200 of a differential assembly (e.g., differential 116 or differential 126 of FIG. 1). FIGS. 2A, 2B, and 2C are described in tandem herein. The primary pin 200 is described herein with respect to an axis system, including an x-axis parallel to a lateral direction, a y-axis parallel to a vertical direction, and a z-axis parallel to a transverse direction. The y-axis is normal to the x-axis and the z-axis is normal to each of the x- and y-axes.

The primary pin 200 may include a first section 210 and a second section 220. The first section 210 may be substantially similar to the second section 220 in size and shape. In one example, the first section 210 is identical to the second section 220.

The first section 210 and the second section 220 may include a cylindrical shape. The first section 210 and the second section 220 may include a non-uniform diameter due to one or more cutouts. The first section 210 may include a first pair of cutouts 212. The second section 220 may include a second pair of cutouts 222. Each of the first pair of cutouts 212 and the second pair of cutouts 222 may be identical to one another. Each of the cutouts may include a planar surface with ramped opposite ends, the ends opposite one another along the y-axis. More specifically, each of the first pair of cutouts 212 comprises a first surface 214 parallel to the y-axis and a pair of angled surfaces 216 at extreme ends of the first surface 214 opposite one another along the y-axis. Each of the second pair of cutouts 222 comprises a second surface 224 parallel to the y-axis and a pair of angled surfaces 226 at extreme ends of the second surface 224 opposite one another along the y-axis. In one example, each of the pairs of cutouts extends in a direction parallel to a longitudinal direction of the primary pin 200.

The first pair of cutouts 212 may be arranged such that the first section 210 is rotationally symmetric about the y-axis. The second pair of cutouts 222 may be arranged such that the second section 220 is rotationally symmetric about the y-axis.

A middle section 230 may be arranged between the first section 210 and the second section 220. The middle section 230 may include a rectangular shape. Additionally or alternatively, the middle section 230 may include a square shape. A width of the middle section 230 may be equal to a diameter of the first section 210 and the second section 220. In one example, a cross-section of each of the first pair of cutouts 212, the second pair of cutouts 222, and the middle section 230 may include an I-shape. A thickness of the middle section 230 may be less than half a diameter of the primary pin 200. In one example, the thickness of the middle section 230 may be equal to a threshold amount of the diameter of the primary pin, wherein the threshold amount is 40%. Cutouts that shape the middle section 230 and remove material of the primary pin 200 relative to the first section 210 and the second section 220 may orient a remaining material in a direction parallel to a longitudinal axis of the primary pin 200. In one example, the longitudinal axis is parallel to the y-axis and normal to a diameter of the primary pin 200.

In some examples, additionally or alternatively, the primary pin 200 comprises an I-beam middle section. The I-beam middle section may include a reduced material thickness relative to other portions of the primary pin 200 flanking the I-beam middle section. An amount of material removed from the I-beam middle section may be determined based on a configuration and demands of a differential.

More specifically, the middle section 230 may include a third surface 232. The third surface 232 may be parallel to and facing the same direction as the first surface 214 and the second surface 224. The middle section 230 further comprises end surfaces 234 that join with the third surface 232 and the first section 210 or the second section 220. In one example, the end surfaces 234 are normal to the first surface 214, the second surface 224, and the third surface 232. In one example, the middle section 230 may include an I-shaped or an H-shaped cross-section along a y-z plane. As such, the middle section 230 may be an I-beam middle section.

The primary pin 200 may be a single-piece machined to include the first pair of cutouts 212, the second pair of cutouts 222, and the middle section 230. As illustrated, depth at which the first pair of cutouts 212 and the second pair of cutouts 222 are machined into the primary pin 200 is less than a depth of the middle section 230. For example, each of the first pair of cutouts 212 and the second pair of cutouts 222 are machined to a first depth into the primary pin 200. The middle section 230 may be machined to a second depth. In one example, the second depth is greater than the first depth.

Turning now to FIGS. 3A, 3B, and 3C, they show different views of a secondary pin 300. In one example, the secondary pin 300 may interface with the primary pin 200 of FIGS. 2A-2C. FIGS. 3A, 3B, and 3C are described in tandem herein.

The secondary pin 300 may include a main body 310. The main body 310 may include a cylindrical shape. The main body 310 may further include a pair of recesses 312. Each of the pair of recesses 312 may be identical to one another. Each of the recesses may include a planar surface with ramped opposite ends, the ends opposite one another along the z-axis. More specifically, each of the recesses comprises a first surface 314 parallel to the z-axis and a pair of angled surfaces 316 at extreme ends of the first surface 314 opposite one another along the z-axis. In one example, the pair of recesses 312 may be shaped similarly to the first pair of cutouts 212 and/or the second pair of cutouts 222 of FIGS. 2A-2C.

A through-hole 318 may be located between the pair of recesses 312 and a bottom surface 321 of the secondary pin 300. The through-hole 318 may include circular openings along with a passage that extends through an entirety of the main body 310. As such, a device may be inserted into the through-hole 318 and protrude through opposite sides of the main body 310. In one example, the openings of the through-hole 318 may be on a same side as the pair of recesses 312. As such, a plane that is parallel to openings of the through-hole 318 may also be parallel with the first surface 314.

The secondary pin 300 may further include a crown 330. The crown 330 may be arranged at an end of the secondary pin 300 opposite the bottom surface 321. The crown 330 may include a first prong 322 and a second prong 324. The first prong 322 and the second prong 324 may be identical to one another. The first prong 322 and the second prong 324 may extend from a side of the main body 310 identical to the side in which the pair of recesses 312 and the through-hole 318 is arranged.

The first prong 322 and the second prong 324 may include a semi-circular cross-sectional shape for a cross-section taken along the x-y plane. A distance between the first prong 322 and the second prong 324 may correspond to a slot 326. In one example, the slot 326 is sized to interface with the middle section 230 of the primary pin 200 of FIGS. 2A-2C. Additionally or alternatively, a height of the first prong 322 and the second prong 324 may be less than a width of the middle section 230 such that the first and second prongs 322, 324 do not extend across an entirety of the middle section 230. An example of the crown 330 interacting with the middle section 230 is shown in FIG. 4. In this way, the slot 326 may be shaped via removing material from the secondary pin 300. In one example, an amount of material removed is equal to a threshold amount of the diameter of the secondary pin 300. The threshold amount may be equal to 40%. Additionally or alternatively, the amount of material removed is such that a width of the slot 326 is less than half the diameter of the secondary pin 300.

The slot 326 may extend in a direction normal to the through-hole 318. In one example, the through-hole 318 is a roll hole pin. More specifically, the slot 326 extends in a direction parallel to the y-axis and the through-hole 318 extends in a direction parallel to the x-axis.

Surfaces of the first prong 322 and the second prong 324 facing the slot 326 may be smooth and planar. In one example, edges of the surfaces facing and adjacent to the slot 326 may be rounded. Surfaces of the first prong 322 and the second prong 324 facing away from slot 326 may include a curvature similar to a curvature of the main body 310. Tops of the first prong 322 and the second prong 324 may be flat and parallel to the x-y plane. In one example, a radius of the main body 310 is arranged within the x-y plane.

Openings of the slot 326 may be accessible from sides of the secondary pin 300 different than the sides of the secondary pin 300 at which the pair of recesses 312 and the through hole 318 are arranged. In one example, the secondary pin 300 may be symmetric. In one example, the secondary pin 300 is rotationally symmetric.

Turning now to FIG. 4, it shows an embodiment 400 of the primary pin 200 interacting with a first secondary pin 402 and a second secondary pin 404. Each of the first secondary pin 402 and the second secondary pin 404 is identical to the secondary pin 300 of FIGS. 3A-3C.

Cutting plane, A-A, taken along an x-z plane shows a cross-sectional view illustrated in FIGS. 5A and 5B. Cutting plane, B-B, taken along an x-y plane shows a cross-sectional view illustrated in FIGS. 6A and 6B. FIGS. 4-6B are described in tandem herein.

The first secondary pin 402 and the second secondary pin 404 interface with the middle section 230 of the primary pin 200. In one example, the crown 330 of the first secondary pin 402 overlaps with a first portion of the middle section 230. The crown 330 of the second secondary pin 404 overlaps with a second portion of the middle section 230, the second portion different than the first portion.

The middle section 230 may be in face-sharing contact with prongs with the crown 330 of each of the first secondary pin 402 and the second secondary pin 404. The middle section 230 may be positioned within the slot (e.g., slot 326 of FIGS. 3A-3C) of the crown of each of the first secondary pin 402 and the second secondary pin 404. The middle section 230 may be pressed against the surfaces of the prong that shape the slot. In one example, each of the first secondary pin 402 and the second secondary pin 404 may overlap with exactly half of the middle section 230. In one example, the crown 330 of the first secondary pin 402 and the second secondary pin 404 may be in face-sharing contact. The slots of the crowns may form a compartment in which the middle section 230 extends through. The direction of the slots may be parallel to the longitudinal axis of the primary pin 200 and normal to a diameter of the primary pin 200.

In one example, additionally or alternatively, the middle section 230 is an interlocking tab and the slots are an interlocking slot configured to receive the interlocking tab. As illustrated in FIG. 5B, the interlocking slot include a square and/or rectangular cross-sectional shape configured to receive the interlocking tab with a complementary shape. A material thickness of the crown 330 may be greater than previous examples such that a stress tolerance of the assembly is enhanced.

Portions of the first section 210 and the second section 220 that flank the middle section 230 may be pressed against curved portions of the crown 330. More specifically, the portions of the first section 210 and the second section 220 that press against the crown 330 press against sides of the secondary pin 300 between the pair of recesses 312.

Alternative embodiments of the disclosure may include a multi-pinion differential including a primary pin including a central I-beam section and opposing end that are coupled to a pair of pinions and a pair of secondary pins that each include notches that mate with the I-beam section of the primary pin at a first end and at a second end coupled to a pinion. Notches of the secondary pins may be perpendicular to roll pin holes in the secondary pins.

The disclosure provides support for a system including a primary differential pin comprising an I-beam middle section and a secondary differential pin comprising a slot that interlocks with the I-beam middle section. A first example of the system further includes where the slot is perpendicular to a roll pin hole. A second example of the system, optionally including the first example, further includes where the slot comprises a square cross-sectional shape. A third example of the system, optionally including one or more of the previous examples, further includes where the secondary differential pin is a first secondary differential pin, further comprising a second secondary differential pin that interlocks with the I-beam middle section. A fourth example of the system, optionally including one or more of the previous examples, further includes where the first secondary differential pin is identical to the second secondary differential pin. A fifth example of the system, optionally including one or more of the previous examples, further includes where the first secondary differential pin and the second secondary differential pin are in face-sharing contact when interlocked with the I-beam middle section of the primary differential pin. A sixth example of the system, optionally including one or more of the previous examples, further includes where a width of the slot is less than a threshold amount of a diameter of the secondary differential pin.

The disclosure provides additional support for a differential assembly including a primary pin comprising an I-beam middle section, and a first secondary differential pin and a second secondary differential pin identical to the first secondary differential pin, wherein a slot of each of the first and second secondary differential pins interlocks with the I-beam middle section. A first example of the differential assembly further includes where a roll pin hole is arranged on the first and second secondary differential pins. A second example of the differential assembly, optionally including the first example, further includes where the roll hole pin is arranged at an extreme end of the first and second secondary differential pins opposite an extreme end at which the slot is arranged. A third example of the differential assembly, optionally including one or more of the previous examples, further includes where the slot comprises a rectangular cross-sectional shape. A fourth example of the differential assembly, optionally including one or more of the previous examples, further includes where the slot is normal to a diameter of the primary pin. A fifth example of the differential assembly, optionally including one or more of the previous examples, further includes where a longitudinal length of the primary pin is equal to twice longitudinal length of the first secondary differential pin. A sixth example of the differential assembly, optionally including one or more of the previous examples, further includes where a thickness of the I-beam middle section is less than half a diameter of the primary pin. A seventh example of the differential assembly, optionally including one or more of the previous examples, further includes where surfaces facing the slot are flat.

The disclosure provides further support for an assembly for a differential including a primary pin comprising an I-beam middle section and a secondary pin comprising a slot that is normal to a roll pin hole and configured to interlock with the I-beam middle section. A first example of the assembly further includes where a width of the slot is less than half a diameter of the secondary pin. A second example of the assembly, optionally including the first example, further includes where a height of the slot is greater than or equal to half a thickness of the I-beam middle section. A third example of the assembly, optionally including one or more of the previous examples, further includes where the secondary pin is a first secondary pin, further comprising a second secondary pin interlocked with the I-beam middle section and in face sharing contact with the first secondary pin. A fourth example of the assembly, optionally including one or more of the previous examples, further includes where each of the primary pin and the secondary pin is symmetric.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
   a primary differential pin comprising an I-beam middle section;
   a first secondary differential pin comprising a slot shaped via a crown comprising a first prong and a second prong that interlocks with the I-beam middle section, wherein the first prong and the second prong comprise a semi-circular cross-sectional shape and a flat top; and
   a second secondary differential pin comprising a slot shaped via a crown that interlocks with the I-beam and is in face-sharing contact with the first secondary differential pin, wherein the first secondary differential pin and the second secondary differential pin further comprise a roll pin hole that extends through an entire thickness of the first and second secondary differential pins, the slot perpendicular to the roll pin hole.

2. The system of claim 1, wherein the slot comprises a square cross-sectional shape.

3. The system of claim 1, wherein the first secondary differential pin is identical to the second secondary differential pin.

4. The system of claim 1, wherein a width of the slot is less than a threshold amount of a diameter of the first and second secondary differential pins.

5. A differential assembly, comprising:
   a primary pin comprising an I-beam middle section; and
   a first secondary differential pin and a second secondary differential pin identical to the first secondary differential pin, wherein a slot shaped by crowns of each of the first and second secondary differential pins interlocks with the I-beam middle section, wherein the crowns of the first and second secondary differential pins are in face-sharing contact, wherein a roll pin hole is arranged on and extends through an entire thickness of the first and second secondary differential pins, and wherein the crowns comprise a first prong and a second prong comprising a semi-circular cross-sectional shape and a flat top.

6. The differential assembly of claim 5, wherein the roll pin hole is arranged at an extreme end of the first and second secondary differential pins opposite an extreme end at which the slot is arranged.

7. The differential assembly of claim 5, wherein the slot comprises a rectangular cross-sectional shape.

8. The differential assembly of claim 5, wherein the slot is normal to a diameter of the primary pin.

9. The differential assembly of claim 5, wherein a longitudinal length of the primary pin is equal to twice a longitudinal length of the first secondary differential pin.

10. The differential assembly of claim 5, wherein a thickness of the I-beam middle section is less than half a diameter of the primary pin.

11. The differential assembly of claim 5, wherein surfaces facing the slot are flat.

12. An assembly for a differential, comprising:
a primary pin comprising an I-beam middle section;
a first secondary pin comprising a slot that is normal to a roll pin hole and configured to interlock with the I-beam middle section, the roll pin hole extending through an entire thickness of the first secondary pin; and
a second secondary pin interlocked with the I-beam middle section and in face-sharing contact with the first secondary pin, wherein
the first secondary pin and the second secondary pin comprise crowns comprising a first prong and a second prong having a semi-circular cross-sectional shape and a flat top.

13. The assembly of claim 12, wherein a width of the slot is less than half a diameter of the first and second secondary pins.

14. The assembly of claim 12, wherein a height of the slot is greater than or equal to half a thickness of the I-beam middle section.

15. The assembly of claim 12, wherein each of the primary pin and the first and second secondary pins is symmetric.

* * * * *